US007421323B2

(12) United States Patent
Dannenberg et al.

(10) Patent No.: US 7,421,323 B2
(45) Date of Patent: Sep. 2, 2008

(54) AUTOMATED VEHICLE BATTERY PROTECTION WITH PROGRAMMABLE LOAD SHEDDING AND ENGINE SPEED CONTROL

(75) Inventors: Robert D. Dannenberg, Fort Wayne, IN (US); Steven R. Lovell, Fort Wayne, IN (US)

(73) Assignee: International Truck Intellectual Property Company, LLC, Warrenville, IL (US)

( * ) Notice: Subject to any disclaimer, the term of this patent is extended or adjusted under 35 U.S.C. 154(b) by 87 days.

(21) Appl. No.: 11/121,508

(22) Filed: May 3, 2005

(65) Prior Publication Data

US 2006/0253237 A1 Nov. 9, 2006

(51) Int. Cl.

*G06F 7/00* (2006.01)
*G06F 19/00* (2006.01)
*B60L 1/00* (2006.01)
*H02P 7/00* (2006.01)

(52) U.S. Cl. ............................ 701/36; 701/99; 307/9.1; 307/130; 340/636.15; 322/17

(58) Field of Classification Search ..................... 701/1, 701/22, 29, 31, 33, 36, 99; 307/9.1, 10.1, 307/11, 112, 116, 125, 126, 130; 340/425.5, 340/500, 636.1, 636.15, 636.16, 636.17, 340/636.2; 320/104, 123, 137, 148, 155, 320/162; 322/17, 28; 361/1, 21, 139, 160, 361/170, 191

See application file for complete search history.

(56) References Cited

U.S. PATENT DOCUMENTS

| | | | | |
|---|---|---|---|---|
| 4,268,787 | A * | 5/1981 | Sloan | 322/8 |
| 5,528,148 | A * | 6/1996 | Rogers | 320/137 |
| 5,568,052 | A * | 10/1996 | Sway-Tin et al. | 324/435 |
| 5,608,309 | A * | 3/1997 | Hikita et al. | 322/28 |
| 6,249,106 | B1 | 6/2001 | Turner et al. | |
| 6,272,402 | B1 * | 8/2001 | Kelwaski | 701/1 |
| 6,417,668 | B1 | 7/2002 | Howard et al. | |
| 6,965,818 | B2 * | 11/2005 | Koenig et al. | 701/36 |
| 2004/0232881 | A1 * | 11/2004 | Amano et al. | 320/104 |
| 2005/0035657 | A1 * | 2/2005 | Brummeett et al. | 307/10.1 |
| 2005/0065684 | A1 * | 3/2005 | Larson et al. | 701/36 |
| 2005/0113988 | A1 * | 5/2005 | Nasr et al. | 701/22 |
| 2006/0071553 | A1 * | 4/2006 | Lengacher et al. | 307/10.1 |

* cited by examiner

*Primary Examiner*—Jack W Keith
*Assistant Examiner*—Edward Pipala
(74) *Attorney, Agent, or Firm*—Jeffrey P. Calfa; Gerald W. Askew

(57) ABSTRACT

Automated motor vehicle battery voltage protection is provided by setting voltage trip points for increasing engine speed and for shedding selected electrical loads. The system is effected by programming a vehicle body computer which communicates with, and exerts control over, various vehicle system controllers over one or more controller area networks. The body computer is programmed to monitor battery voltage and initiates an increase in engine speed first, and if that fails to restore a minimum battery voltage level, begins shedding loads in a predetermined order.

8 Claims, 8 Drawing Sheets

AUTOMATED VEHICLE BATTERY PROTECTION WITH PROGRAMMABLE LOAD SHEDDING AND ENGINE SPEED CONTROL

BACKGROUND OF THE INVENTION

1. Technical Field

The invention relates to an apparatus and method for maintaining a minimum state of charge on a motor vehicle battery.

2. Description of the Problem

Several classes of vehicles, particularly heavy-duty vehicles, spend substantial periods of times with their engines idling while supporting electrical loads. These loads can easily exceed the capacity of the vehicle's alternator to support the loads at diesel engine idle with the result that the loads become a direct drain on the vehicle's battery. Under these conditions battery voltage may drop low enough to kill the engine. Drivers have had to monitor battery voltage on the vehicle's instrument cluster and increase engine speed in response to declining battery voltage. Some vehicles have come equipped with preset or variable engine speed controls that can be enabled through vehicle cruise control switches or remote body mounted engine speed control switches for use if the vehicle is parked. Other vehicles, equipped for power takeoff (PTO) applications, provide for automatic increases in engine speed to supply increased engine power when the PTO is engaged. See for example U.S. Pat. No. 6,482,124 which is assigned to the assignee of the present application.

SUMMARY OF THE INVENTION

According to the invention there is provided a motor vehicle battery monitoring and protection system. The system includes an engine and an engine controller for controlling the speed of the engine. The vehicle battery voltage level is monitored by a vehicle body computer which executes a stored program for the control of vehicle engine speed responsive to the detected voltage levels. The vehicle body computer may be further programmed to initiate and control load shedding if engine run up is ineffective in restoring battery voltage levels. The body computer is connected to vocational controllers, including the engine controller, over one or more controller area networks. The various vehicle systems which constitute the electrical loads on the vehicle battery are under the control of vocational controllers, or the body computer, and may be shut off to reduce the electrical load on the battery. Where loads are under the direct control of a vocational controller the body computer directs operation of the vocational controller over a controller area network. Increased engine speed and load shedding are generally initiated at voltage level trip points, with the trip point for initiating engine run up being higher than the voltage level for load shedding. Interlocks inhibit operation of the battery protection system under certain conditions, including, for example, when the vehicle is being driven or when the vehicle is engaged in power take off operation (PTO). It is undesirable to provide unexpected change in engine speed while PTO is active.

Additional effects, features and advantages will be apparent in the written description that follows.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE INVENTION

Figure 1:
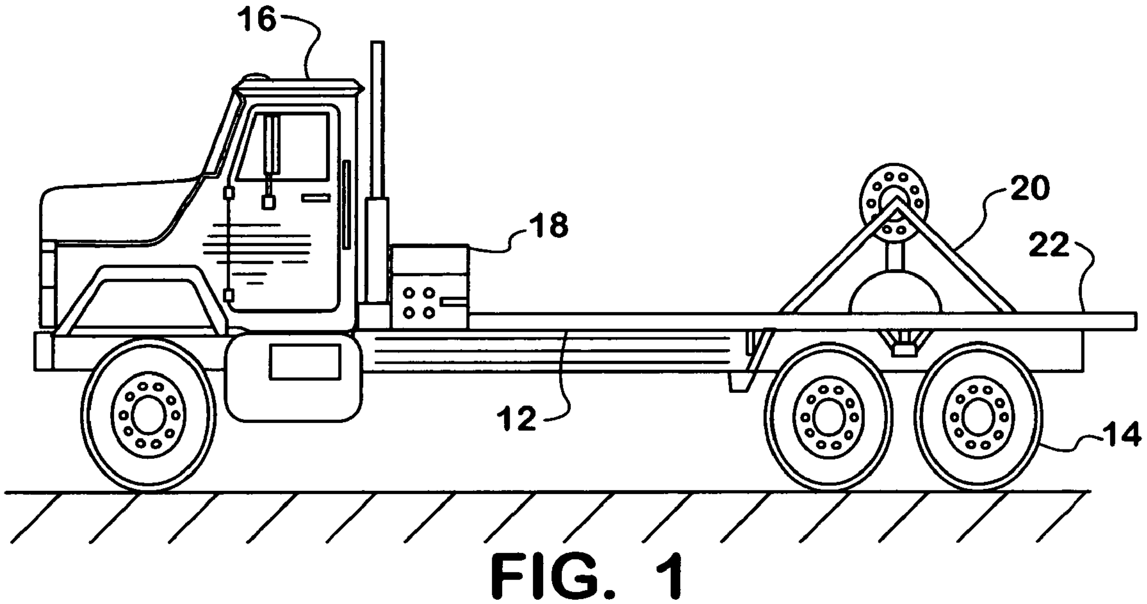
FIG. 1 is a side elevation truck equipped with a power takeoff operation application.

Referring now to the figures and particularly to FIG. 1, an environment for application of a preferred embodiment of the invention will be described. It is contemplated that the invention be applied to trucks having internal combustion, particularly diesel engines. The present invention is advantageously applied to vehicles adapted for power take-off operation (PTO), although PTO capability is not necessary and the invention is readily applied to non-PTO capable vehicles.

A truck 12 is illustrated which has been adapted for service as a wrecker. Wreckers are a classic example of PTO capable vehicles. A driver usually controls the vehicle from a cab 16 positioned in the forward portion of the vehicle. An auxiliary system is controlled from a panel 18 installed on one side of the vehicle off of cab 16. A winch 20 is positioned over the vehicle siderails 22 and the rear wheels 14. Winch 20 may be used to tow a vehicle onto a pivotable extendable bed 24 for transport of the vehicle. The winch 20 is part of the auxiliary system controlled from panel 18. Panel 18 includes switches for controlling operation of the auxiliary system and gauges indicating values for a hydraulic PTO system operation or for an electrical motor PTO application. The auxiliary systems installed on the vehicle may take any one of a number of forms, with PTO applications being but one example.

Figure 2:
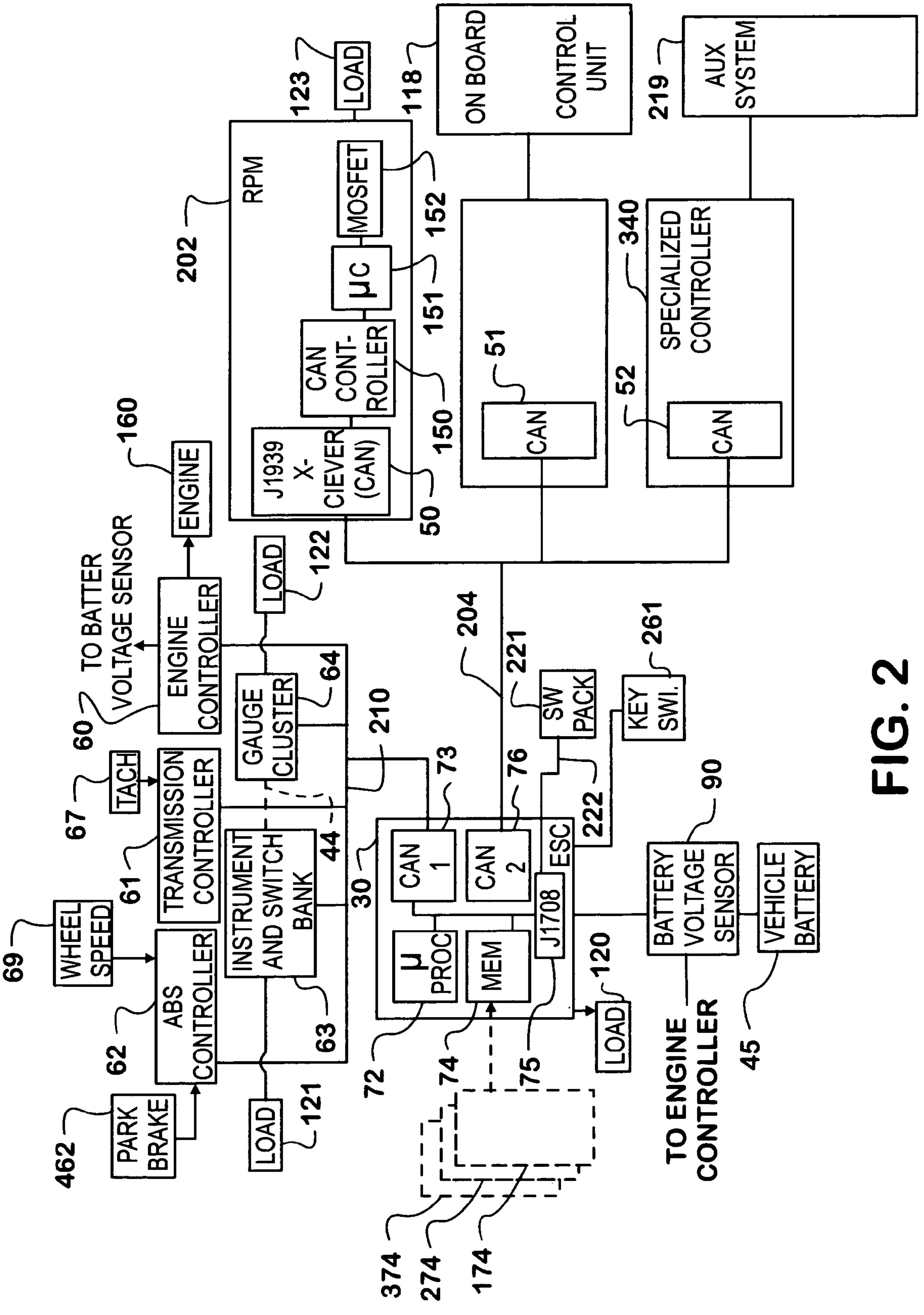
FIG. 2 is a high level block diagram of a vehicle electrical control system based upon controller area networks.

FIG. 2 illustrates a control schematic for a vehicle electrical control system, based on a body computer or electrical system controller (ESC) 30, a plurality of vocational controllers, e.g. engine controller 60, and first and second controller area networks 210 and 204. The first controller area network (CAN) 210 may be referred to as the powertrain CAN 210 and interconnects common vehicle systems for which the Society of Automotive Engineers has published standard communication formats as part of the SAE J1939 protocol. In such a system, a vocational controller such as an engine controller 60 will always broadcast engine oil pressure in the same manner, varying only in the value placed the field which reports the measured value for pressure. The second controller area network 204 may be referred to as a body CAN 204. Body CAN 204 is used for communications among non-standard, specialized vocational controllers that might be installed on a vehicle such as a hydraulic power take off controller 340 or a remote power unit 202. Messages from such units, while still broadly conforming to SAE standards, have specialized meanings (in the sense that ESC 30 responds in particular ways) which may be unique to a particular vehicle. Lastly, ESC 30 communicates with a switch pack 221 over an SAE J1708 bus 222. In the preferred embodiment the battery protection feature of the invention is invoked through a switch from switch pack 221.

Powertrain CAN 210 interconnects an anti-lock brake system (ABS) controller 62, a transmission controller 61, an engine controller 60, and instrument and switch bank controller 63 and a gauge cluster 64. Engine controller 60 controls engine 160 output and is connected to various sensors for monitoring engine operation. The engine sensors connected to the engine controller 60 may include a variable reluctance sensor for generation of a tachometer signal. Alternatively, and as shown in the figure, the source of vehicle road speed may be an variable reluctance sensor 67 coupled to the transmission controller 61. Park brake 462 status may be reported by ABS controller 62 or be provided as a direct input to ESC 30. Two additional vocational controllers are shown, an instrument and switch bank 63 and a gauge cluster 64. Each of these controllers may have electrical loads 121, 122 attached thereto. For example, instrument lighting may be under the control of a gauge cluster 64.

The vocational controllers connected to powertrain CAN 210 represent systems common to virtually all vehicles. The vocational controllers communicate with one another and with an electrical system controller 30 by broadcasting messages over a data bus. Any controller can be programmed to respond to the messages, which do not include specific address information. Specialized functionality is added to a vehicle by adding a body CAN 204 and attaching to the body CAN, one or more specialized or programmable vocational controllers. Here three such controllers are shown including a remote power unit 202 which can supply switched power to a load 123, an input monitoring package 40 connected to an onboard control unit 118 and a specialized controller 340, such as a hydraulic power take off controller, connected to an auxiliary system 219, such as an hydraulic circuit. Each vocational controller of the group has a CAN interface transceiver 50, 51, 52. Remote power unit 202 is illustrated in greater detail showing a CAN controller 150 connected to the CAN interface transceiver 50, a microcontroller 151 programmed for response to selected signals broadcast over body CAN 204, and a power switching MOSFET 152 by which power is selectively provided an electrical load 123.

Both powertrain CAN 210 and body CAN 204 are connected to ESC 30, the vehicle's body computer. ESC 30 can be programmed to broadcast signals on either bus in response to signals received on the other bus, or on the SAE J1708 bus 222. ESC 30 includes CAN interface transceivers 73, 76, a microprocessor 72, programmable memory 74 and a J1708 interface 75. ESC 30 is generally connected to perform certain vocational controller functions, such as control of an electrical load 120. Examples of electrical loads which may be under the direct control of ESC 30 include vehicle interior and exterior lights, including driving and marker lights. Programming 174, 274, 374 is stored in ESC memory 74. Programming includes the engine ramp and load shedding program 174, a table 274 of loads ordered for priority in shedding, and a list 374 of interlocks relating to conditions under which program 174 may be executed. ESC 30 includes input ports which are connected to a battery voltage sensor 90 for the receipt of battery voltage signals developed from a vehicle battery 45. In possible alternative embodiments the battery voltage signal may be applied to the engine controller 60 and broadcast over powertrain CAN 210 by the engine controller. Key switch 261 position is also monitored on an input port.

The preferred embodiment of the present invention provides for increasing engine speed when battery 45 voltage drops below a programmable trip point level for a minimum, programmable period of time. The feature engages only when various interlock conditions are met. For example, it would be inappropriate for engine speed to increase when the vehicle is stopped at a stop light. It may also be inappropriate for engine speed to vary during power take off operations. Where increased engine speed proves insufficient to maintain battery 45 voltage, the present invention can further provide for shedding electrical loads on the vehicle battery. The trip point or points for shedding loads is also programmable, as is the order or priority for dropping loads.

The preferred embodiment is realized primarily in a software program 174 which in the preferred embodiment resides in memory 74 in the ESC 30. The software program 174 provides for ESC 30 to read and respond to various inputs, including signals received over either the powertrain CAN 210 or the body CAN 204, or discrete input signals, before issuing instructions for ramping up engine speed or for shedding a load. In brief, ESC 30 reads the switch status from a selected switch in rocker switch pack 221 over J1708 bus 222. The target engine speed is selected beforehand by a vehicle operator. The engine speed selected should be high enough to support the likely mix of loads carried by the vehicle electrical system during periods of engine idling.

Figure 3:
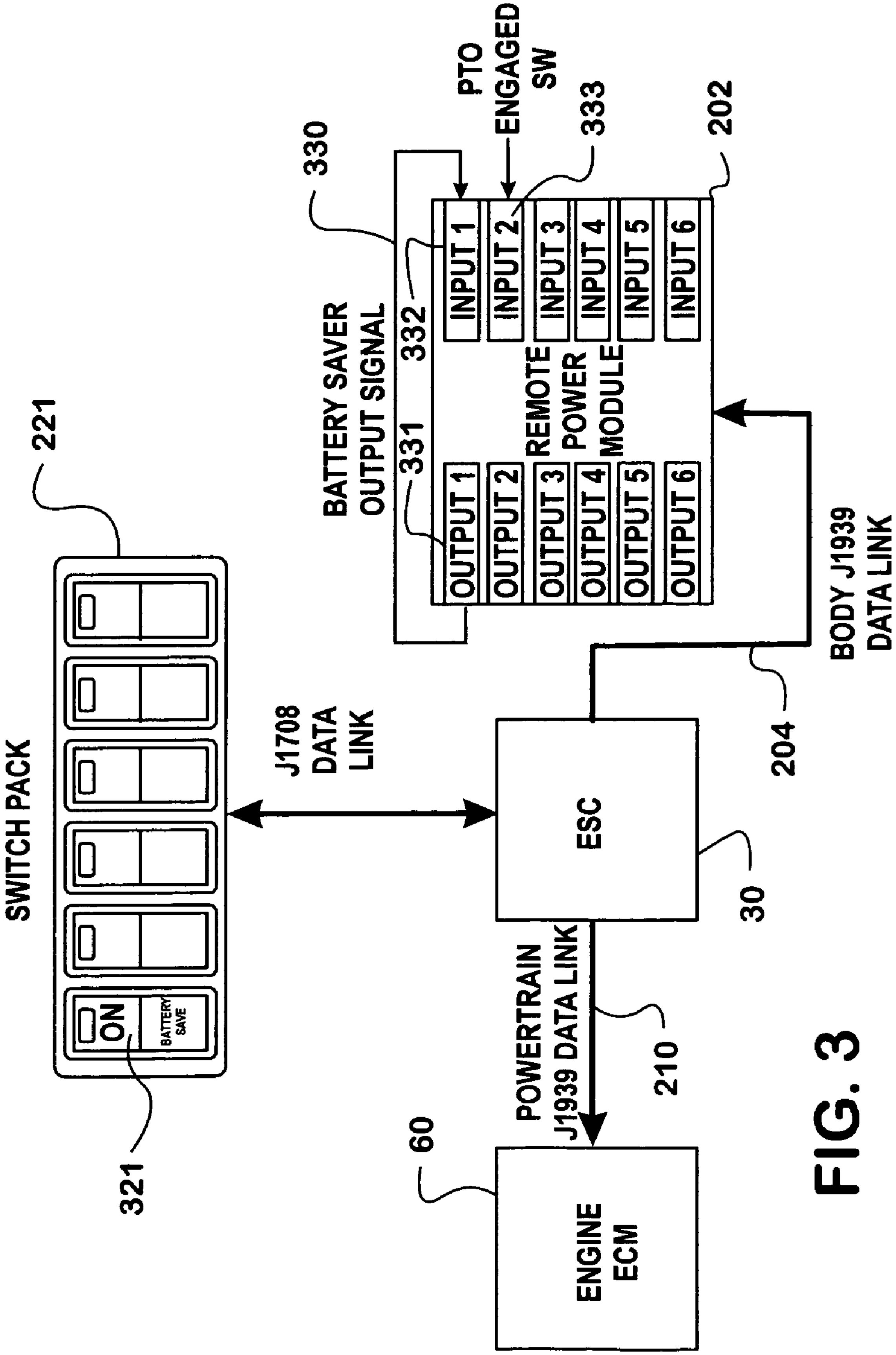
FIGS. 3, 4 and 5 are simplified schematics illustrating different hardware embodiments implementing the invention.
Figure 4:
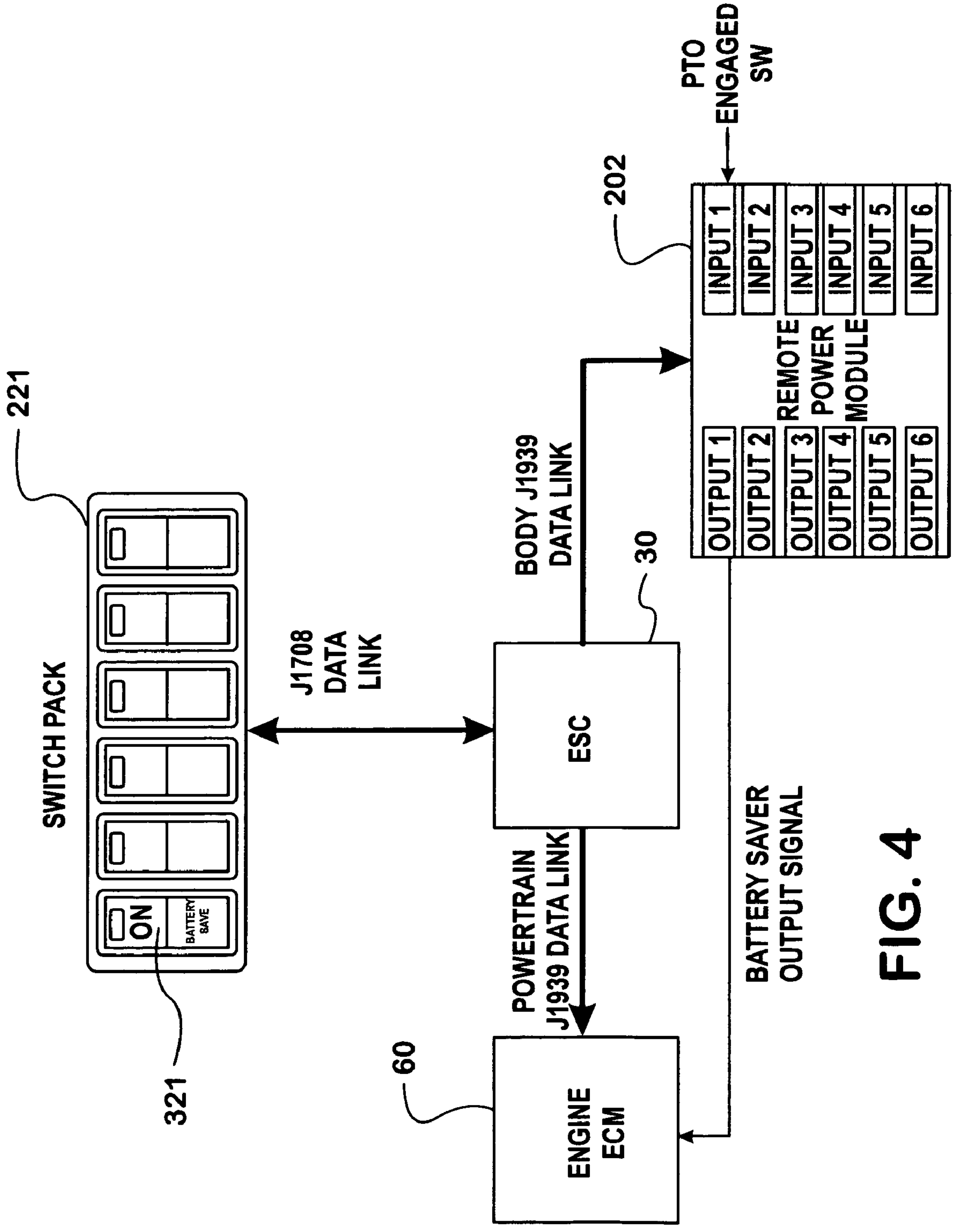
Figure 5:
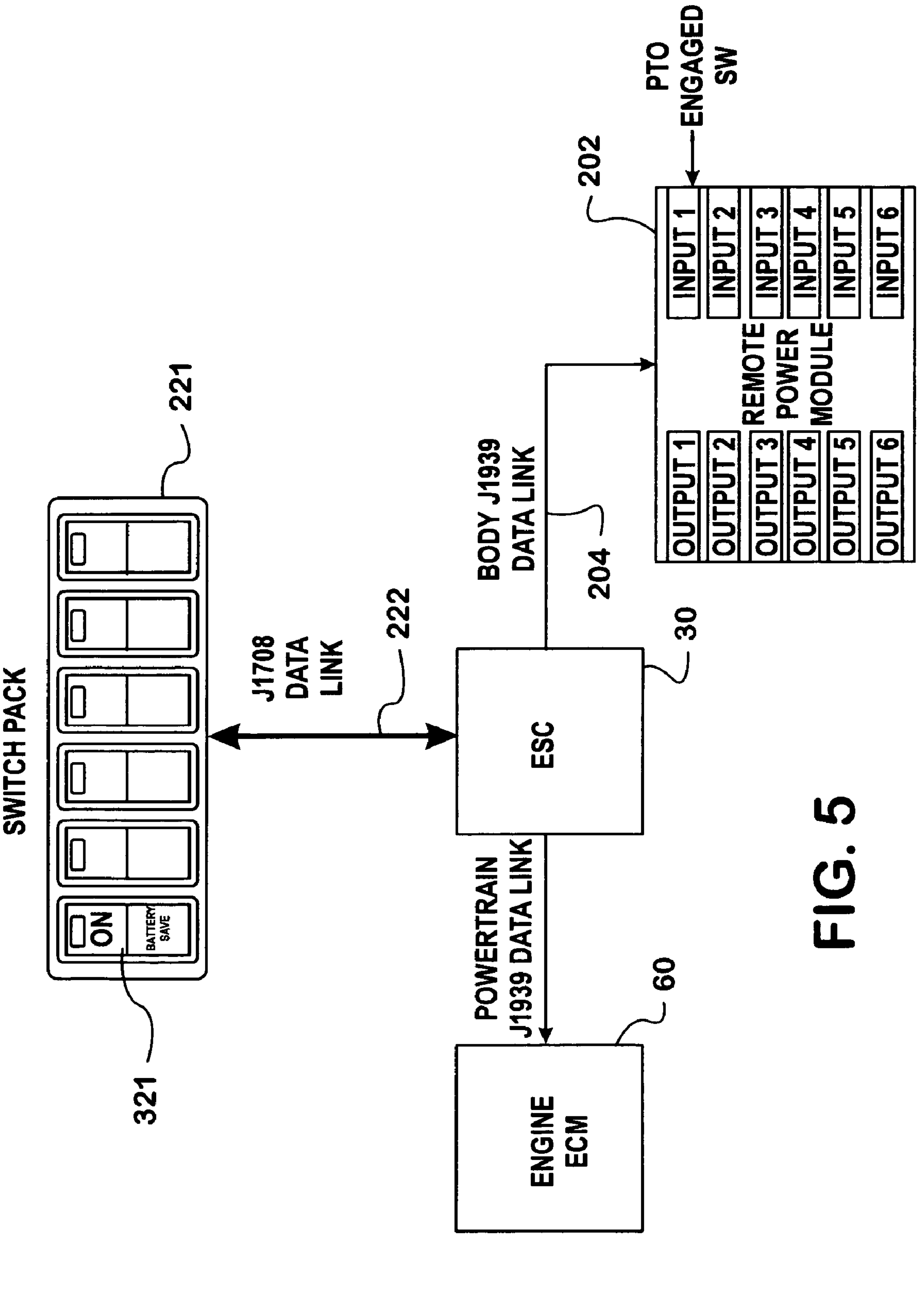

Referring to FIGS. 3-5, any of three general hardware modifications to the vehicle electrical control system may be done to enable the battery protection scheme of the present invention in combination with appropriate programming of ESC 30. With switch 321 closed to enable the battery protection system, an output 331 of remote power module 202 may be hardwire 330 connected to an input 332 of the remote power module. The remote power module is programmed to ramp the engine through a network command to ESC 30. Still another input 333 serves as a switch connection for a PTO engagement switch. Switch 321 may include an indicator light set to flash when the battery protection system is on. Failure of the diagnostic system may be indicated by varying the rate of flash. A diagnostic failure in the system results in turning outputs to an off state.

In another variation engine ramping is provided by a direct signal on an input port to the engine controller 60. Here an output from the remote power unit 202 may be directly connected an input of the engine controller 60.

In a preferred arrangement no new hardwired linkage is added as illustrated in FIG. 5. ESC 30 relies exclusively on network communications and direct sensor inputs for issuing instructions to the engine controller to ramp engine output up and down.

In summary the preferred embodiment of the invention requires minimal to no hardware modification of a network equipped vehicle. A programmable control module, typically the ESC 30, has access to multiple sources of information through discrete signal inputs as well as network communication links to initiate and inform the logical functionality. Enablement is readily provided through an in cab mounted switch which requires only programming of the ESC 30 to define.

The software implementation meets several criteria. The software 174 and associated programmable table 274, provide a ramp up voltage trip point to force ramp up of the engine speed. A programmable idle voltage trip point operates to release the engine to idle. A delay is built in following detection of a low voltage condition requiring a minimum duration of the low voltage condition before ramp up of the engine is executed. This is done to avoid continual cycling of engine speed. The engine will not ramp up for a momentary downward spike in voltage, as may occur when an electrical load is turned on. The case of a motor switching on and Off, or undergoing periodic loading, provides a good example of a system which might briefly depress battery voltage. Similarly, once a ramp up is executed, another programmable delay prevents an immediate return to idle. Interlocks may be added to prevent ramp up under certain conditions. For example, the battery monitoring program may be disabled when the transmission is in any forward or reverse gear (for automatic transmissions), the park brake is released, road speed is indicated to be greater than 5 KPH, or PTO is engaged, or some combination of these conditions. A rocker switch is provided on the instrument panel to allow the operator to disable the battery saver feature at any time. It will now be apparent to those skilled in the art that a vehicle operator can program any set of logical combinations (and/or) or add other conditions as interlocks. The load shed trip point may be made programmable as well as a delay before load shedding occurs. A load restore trip point may be programmed, as well as a delay introduced before any load can be turned back on.

Figure 6A:
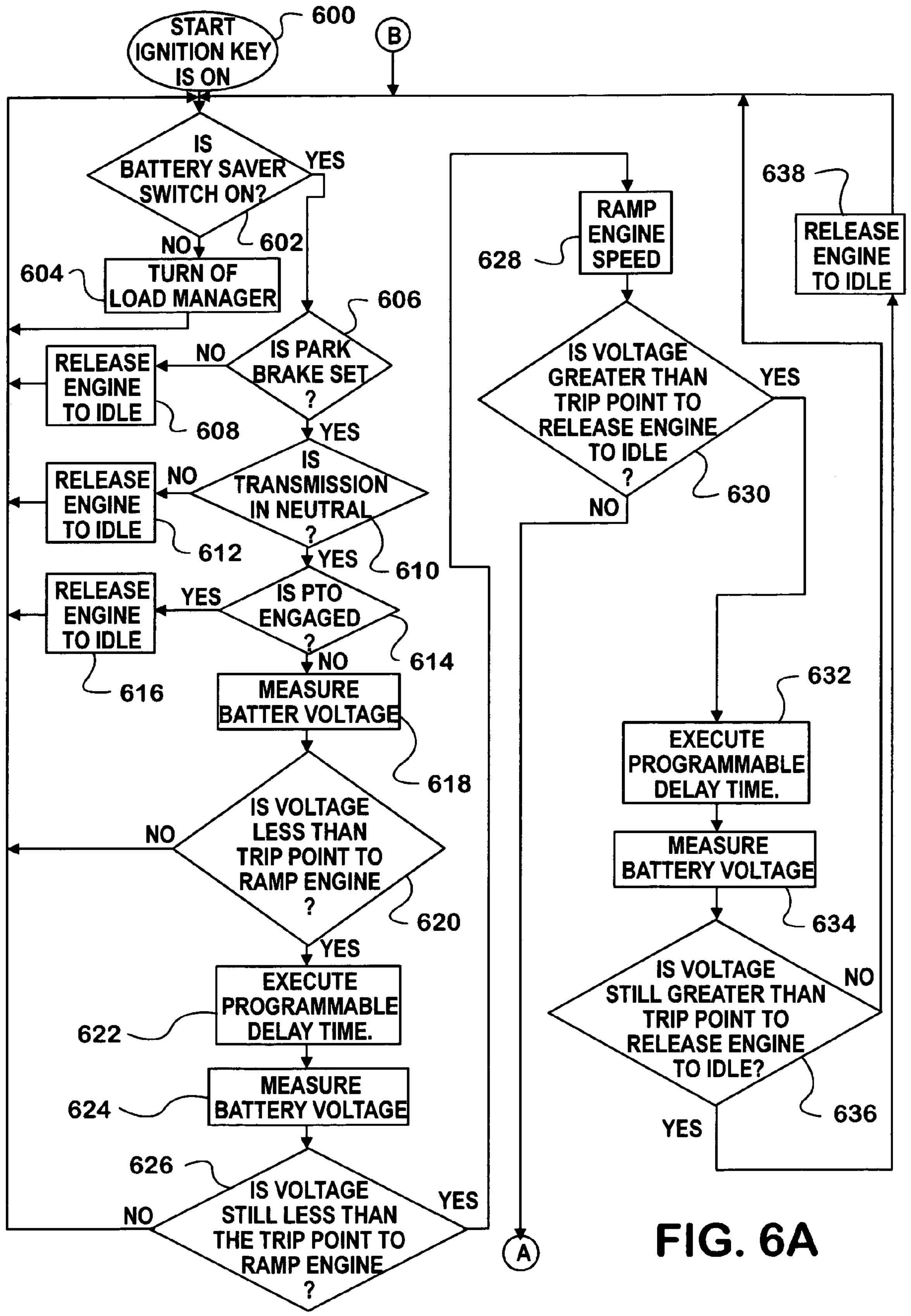
FIGS. 6A-B is a flow chart for a computer program executed by a vehicle body computer for implementing the invention.
Figure 6B:
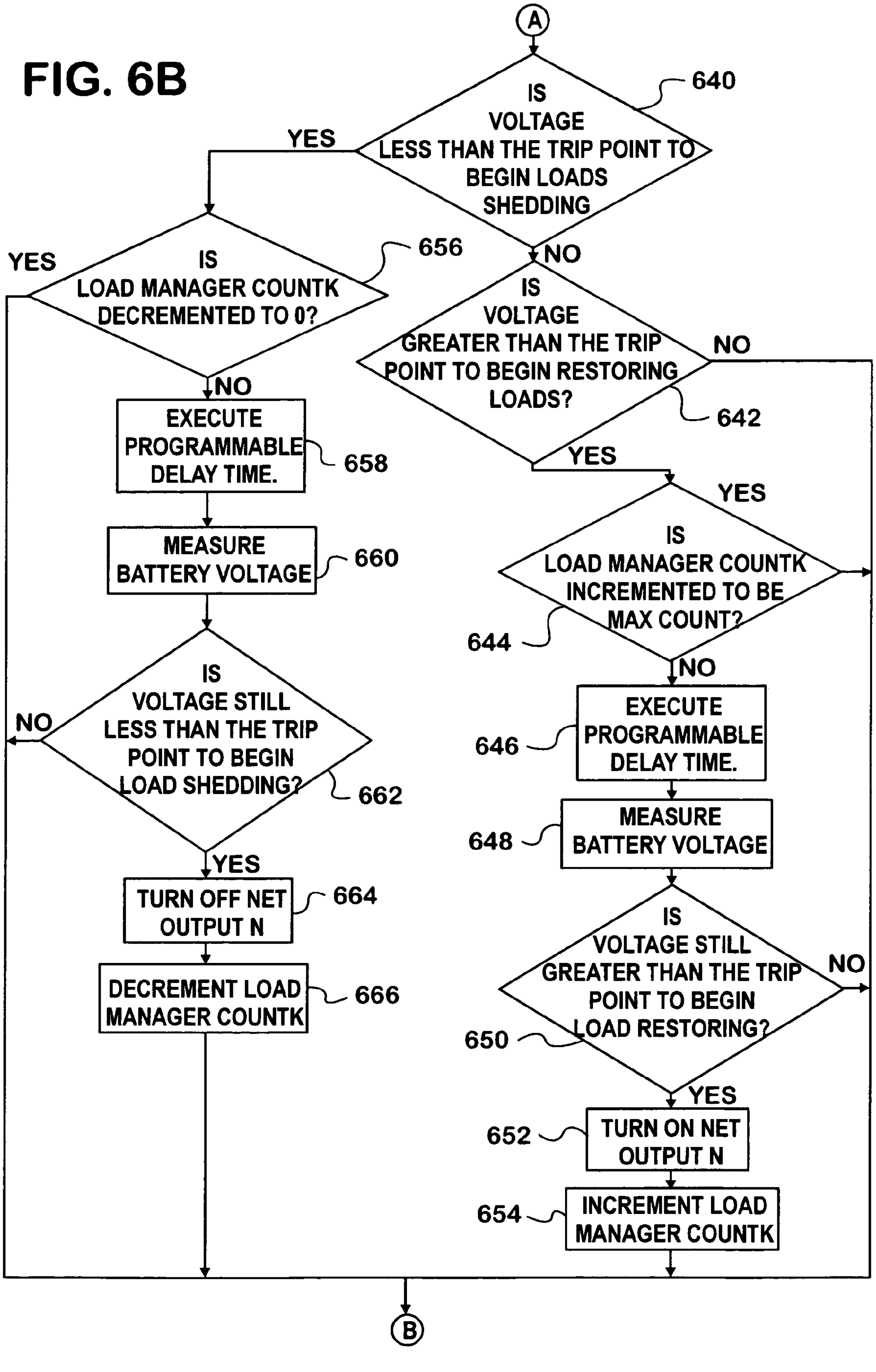

FIGS. 6A-B comprise a flow chart illustrating operation of a software module suitable for execution on ESC 30 which implements engine speed ramping, load shedding and load restoration in accordance with a first preferred embodiment. Program execution begins with step 600 with positioning of the start ignition key 261 to on. Next, at decision step 602, the position of the battery saver switch 602 is polled to determine if battery saver/load manager program is to be executed in full. Obviously this step is present only if an enable switch (battery saver switch) is used. If the switch is not enabled, the NO branch is taken from step 602, and the program is turned off in the sense that the battery saver switch status is periodically polled over the J1708 bus but no other program operations are undertaken. Step 602 may be entered following steps which have increased engine speed in response to execution of the program. Accordingly, turning off the load manager also release the engine to idle.

Following the YES branch from step 602, or if no battery saver switch is installed on the vehicle, the program determines if a set of predetermined conditions for engine speed ramping and load shedding are in place. The steps include determining if the park brake is set (step 606), the transmission is in neutral (step 610) and if power takeoff operation is engaged (step 614). If the results are positive for either of steps 606 and 610, or negative for step 614, the engine is released to idle (steps 608, 612, 616) as engine ramping is not permitted. Following steps 608, 612 and 616 the program loops back to step 602 for cycling through the steps until the status of the three steps all meet the required combination.

When the park brake is set, the transmission is in neutral and PTO is not engaged, execution will advance from step 614 along the NO branch to step 618 for measurement of battery voltage. The voltage measured at step 618 is compared to a engine ramp voltage trip point in step 620. If it is determined at step 620 that battery voltage is less than a trip point for ramping engine speed the YES branch is taken for implementing steps for boosting electrical generating system output. Otherwise, where system voltage is acceptable, the NO branch is taken back to step 602.

It is possible that a battery voltage below the trip point was momentary, possibly the result of a load having been turned on. Thus, before engine speed ramping is implemented a delay is executed (step 622) following the YES branch from comparison step 620. Following the delay, battery voltage is measured a second time (step 624). This new measurement is compared to the same trip point. If battery voltage has recovered the NO branch is taken to loop program execution back to step 602. However, if measured battery voltage is still less than the engine ramp trip point the YES branch is followed to step 628 where engine speed is ramped up. Following ramping up of engine speed, the last voltage measurement is compared to the trip point once again. If voltage is greater than the trip point to release the engine to idle (which may or may not be the same trip point used at steps 620 and 626) the YES branch is taken to step 632 for assuring that all conditions required for release have been met. Release of the engine to idle is not allowed to occur unless a minimum time period has elapsed since engine speed was ramped up. Providing for a minimum delay is done by executing a programmable delay at step 632. Next, at step 634 battery voltage is again measured. The newly measured voltage is compared to the release voltage trip point at step 636. If the release voltage trip point is still being exceeded the YES branch is followed to step 638 for releasing the engine to idle and return to step 602. Otherwise execution returns directly to step 602.

If at step 630 measured battery voltage has not recovered to a voltage exceeding the release trip point, execution advances (by way of A) to step 640. At this point the process of determining whether conditions indicate that load shedding should begin. At step 640 the voltage measured at step 628 is compared to a load shedding trip point. If the measured voltage is less than the load shedding trip point, which is less than the engine speed ramping trip point, program execution follows the YES branch to step 656.

A programmable number of loads are available for shedding indicated by a load manager counter K which initially is set to the number of loads available and which has a minimum value of 0. Each shedable load is associated with a particular non-zero whole number. At step 656 it is determined whether the counter K is non-zero or not. If K has the value 0 no loads are available for shedding and the YES branch is taken to loop the program back to step 602. If however K is non-zero, loads are available to be shed. The NO branch is followed from step 656 to step 658, where a delay is executed before determining if a load is to be shed. This is done to prevent load shedding from occurring due to a momentary depression of voltage, possibly due to a change in total load on the vehicle electrical system. Next, at step 660, battery voltage is measured. Next, at step 662, the newly measured voltage is again compared to the load shedding trip point. If the voltage is less than the load shedding trip point steps 664 and steps 666 are executed following the YES branch from the comparison at step. These steps provide for the turning off of the next output N to a load where N equals the current value for K. Following shut off of an output, the load manager count K is decremented at step 666. Following the NO branch from step 662 or following step 666 execution returns to step 602.

Returning to step 640 the situation where the measured voltage does not fall below the load shedding trip level is considered. Under these circumstances the possibility that loads may be restored is taken up. Following the NO branch from step 640 the most recent voltage measurement is compared with a load restoration trip point at step 642. If the voltage fails to exceed the load restoration trip point the NO branch is taken to loop program restoration back to step 602. If the voltage exceeds the load restoration trip point at step 642 the YES branch is taken to step 644, where, in effect, it is determined whether there are any loads to be restored. If counter K equals its maximum allowed value no loads remain to be restored and program execution can be returned via the YES branch to step 602.

Where, at step 644, it is determined that loads remain cutoff, the NO branch is taken to step 646 for execution of a program delay. Again the program delay is done to avoid taking a step involving an operational change (here restoring a load) if there is a possibility that the voltage measurement reflected a transient value. Another voltage measurement is taken at step 648 after the delay is completed. This new measurement is compared at step 650 with the load restoration trip value. If the voltage fails to exceed the trip point the NO branch is taken to loop execution back to step 602. If the measured voltage level has exceeded the load restoration trip point for two consecutive, time spaced tests though, the YES branch is taken to step 652 and the next output N where N=K is turned on and the counter K is incremented (step 654). Program execution thereupon returns to step 602.

An alternative embodiment of the invention offers graduated increases/decreases of engine speed in fine increments to achieve apparently continuous varying of engine speed. Engine speed can be so varied between idle up to a preprogrammed maximum speed. In the second embodiment of the present invention engine speed is increased progressively, and just enough to satisfy the vehicle's electrical loads, and not all the way to a preselected increased idle speed. As described above, such an idle speed is typically chosen to satisfy any reasonable combination of electrical loads. Providing for a varying idle can result in smaller increases in engine speed, saving on fuel consumption and reducing wear on the engine. The maximum allowed engine speed can conveniently be set higher than the predetermined increased idle used in the first embodiment, since higher engine speeds will only be demanded to meet whatever electrical load is carried by the vehicle.

The second embodiment of the invention provides, as does the first embodiment, for filtering out system voltage spikes. The time delay built into the response is configured somewhat differently however in that it requires the voltage remain continuously below a threshold, rather than checking the voltage at the beginning and end of a time delay period. A different set of interlocks is also used. In the second embodiment interlocks are usually based on the status of the accelerator pedal, the brake pedal and cruise/throttle control operation. Of course, the selection of interlocks can be made operator dependent and can extend to things such as the heating, ventilation, air conditioning (HVAC) control. The second embodiment does not require any remote power modules/generic accessory controllers or a second CAN. Of course, if either is present, they may be used for accommodating additional or alternative interlocks. Load shedding, if used, is implemented in a manner similar to the first embodiment. Accordingly, the description of load shedding is not duplicated here.

Figure 7:
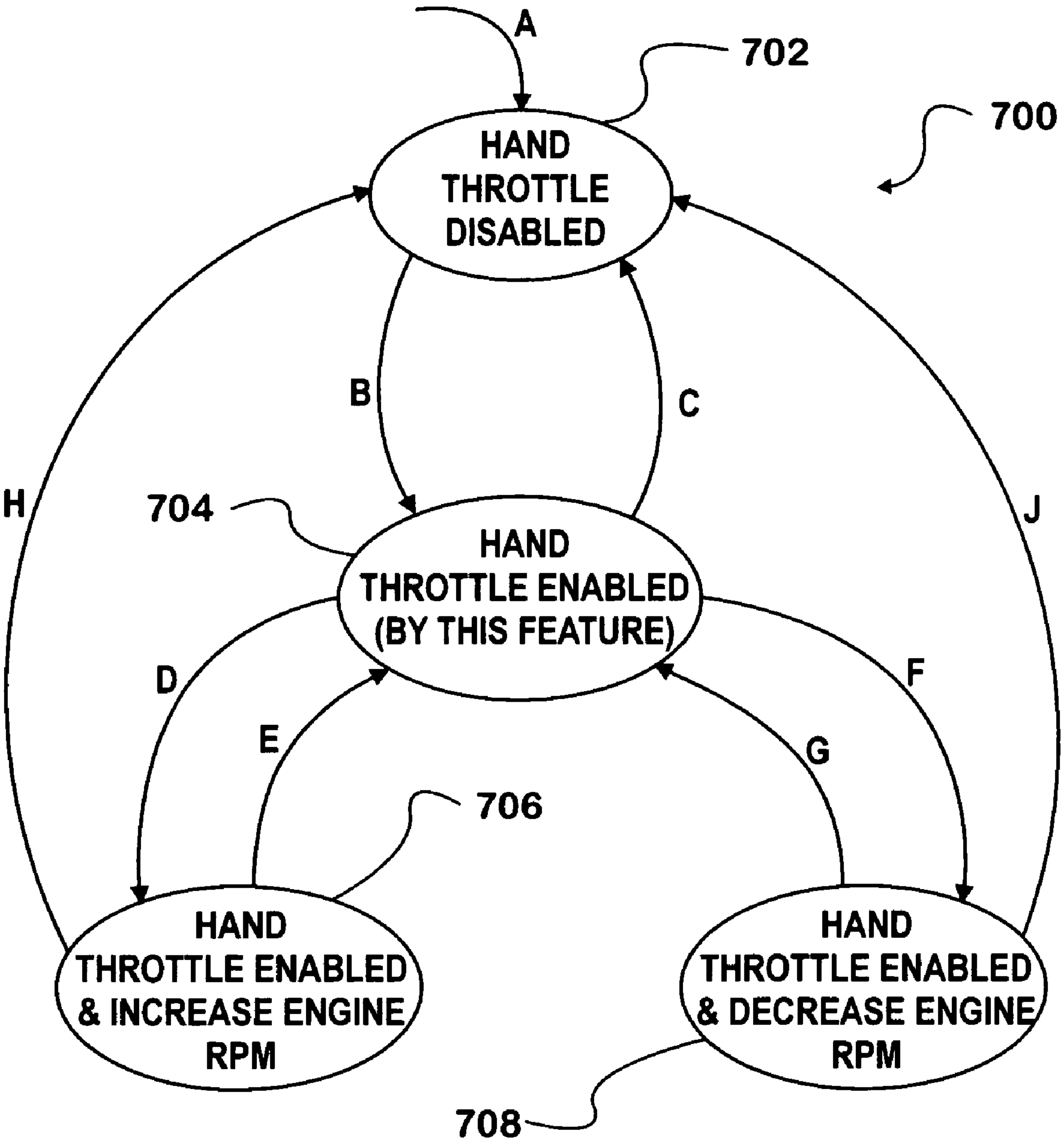
FIG. 7 is a state diagram illustrating implementation of a second embodiment of the present invention.

Referring to FIG. 7, the second embodiment of the invention, as implemented on a body computer, is illustrated through the device of a state diagram 700. From a vehicle start, or similar start point, a transition A reflects detection of a key switch transition to RUN or a reset of the body computer (ESC 30). Upon occurrence of either of these events the system assumes its initial state 702 which is that the hand throttle/cruise is disabled. This is the normal operating state of the vehicle. Several parameters are defined for the program executed by ESC 30 implementing the state machine 700. These parameters are defined in terms of units, within a defined range and consistent with a predefined increment, in the absence of a programmed value a default is provided. The parameters include a Low Battery Voltage parameter, which is in volts, in the range of 10 to 18 volts, is incremented in steps of 0.05 volts and has a default value of 12.7 volts; a Low Battery debounce time which is in seconds, can range from 1 to 255 seconds, has an increment value of 1 second and a default value of 30 seconds; a high battery value (10-18 volts, 0.05 volt increments, 13 volts default and must exceed low battery voltage); high battery debounce time (typically identical to low battery debounce time; and Maximum engine speed (rpms, range 700 to 2000, increments of 1 and a default of 1300).

Only one transition out of the normal operating state 702 is provided, that occurring along transition B. Transition B occurs when the conditions for transition C (described below) are not met AND battery voltage is less than its minimum allowed value AND hand/throttle cruise are disabled. Along transition B the system state changes to hand throttle enabled (and under the control of the program) 704. From the Hand Throttle enabled state 704 engine speed may be increased (transition D to state 706) or decreased (transition F to state 708). In addition, conditions may change such that the program loses control of engine throttle (transition C).

The case where the state reverts from (program control of) hand throttle enabled (state 704) to (program control of) hand throttle disabled (state 702) along transition C is considered first. Transition C occurs when any number of events occurs including: (a) the key switch is no longer set to RUN; OR (b) the park brake is no longer set; OR (c) the park brake is no longer providing a good status signal; OR (d) the transmission is no longer in neutral or park; OR (e) the transmission controller is no longer providing a good status signal for the transmission; OR (f) the engine is no longer running; OR (g) the engine controller is no longer providing a good engine status signal; OR (h) the brake switch is/has been depressed; OR (i) lack of a good status signal for the brake switch; OR (j) vehicle speed is not less than driveline jitter; OR (k) lack of a good status for the vehicle speed signal; OR (l) the accelerator pedal position is not less than 5% depressed; OR (m) absence of a good accelerator pedal position signal; OR (n) the hand throttle transitions to disabled (e.g. manually by a driver through operation of an enable switch-mounted on the steering wheel or in a switch pack); OR (o) the hand throttle status equals disabled; OR (p) the hand throttle switches do not have a good status; OR (q) any interlock is activated which requires engine speed control to be disabled and engine speed returned to idle; OR battery voltage exceeds the desired high battery value for at least the duration of a programmable high battery debounce time. The foregoing list is by no means exhaustive. Other interlocks may be stipulated. These may or may not be communicated over an optional second CAN, by generic CAN controllers, etc.

Another transition from state 704 is along transition path D to the hand throttle enabled and increasing engine speed state 706. In state 706 engine speed is gradually increased until the conditions triggering transition H or transition E occur. The transition H conditions are identical to the transition C conditions and relate to loss of the conditions precedent for operation of the program at all. Along transition path H the state returns to the hand throttle disabled state 702. The conditions for transition E relate to meeting load demands or reaching the maximum allowed engine speed. More particularly, transition E occurs when the conditions for transition H are not met; AND EITHER battery voltage is not LESS than the programmed value for low battery voltage, OR engine is speed has reached the maximum allowed value.

Engine speed can also decrease from hand throttle enabled state 704. The conditions required for initiating transition F from state 704 to the decrease engine rpm state 708 are that the conditions for transition C are not met and that and that measured battery voltage exceeds the high battery value parameter. In state 704 the engine controller will ramp engine rpms downwardly until the conditions for transitions G (returning the state to hand throttle enabled state 704) or J are met (hand throttle disabled state 702). The conditions required for transition G are that the conditions for J are not met and that battery voltage does not exceed the maximum allowed value (High_Batt_Value). Transition J conditions are identical to those for transition C.

The invention provides for automated engine speed control and can be extended to provide load shedding. Interlocks defining conditions under which the program runs are software implemented. The program is readily tailored to conditions of vehicle use, allowing adjustment of program parameters such as delays, voltage trip points and the order in which loads are shed and added. The program is automatically disabled under fault conditions.

While the invention is shown in only a few of its possible forms, it is not thus limited but is susceptible to various changes and modifications without departing from the spirit and scope of the invention.

What is claimed is:

1. A motor vehicle comprising:

an engine installed on the motor vehicle as its prime mover;

a power take off application installed on the vehicle drawing mechanical energization directly or indirectly from the engine;

first and second a controller area networks including a power train controller area network and body controller area network;

a plurality of vocational controllers including an engine controller connected to first controller area network for the exchange of data and an electrical system controller connected to the first and to the second controller area networks, the vocational controllers each having at least one vehicle subsystem associated therewith and the plurality of vocational controllers providing messages over the first or second controller area networks relating to motor vehicle conditions;

a vocational controller for the power takeoff application, the vocational controller for the power takeoff a application being connected to the second controller area network and the Dower takeoff application being powered from the engine;

a vehicle battery connected to be charged by operation of the engine;

means for providing vehicle battery voltage measurements to at least a first of the plurality of vocational controllers;

a battery monitor program stored on the first vocational controller for execution, the battery monitor program being responsive upon execution to at least two battery voltage trip points, including a first voltage trip point to which the programmed vocational controller is responsive for directing the engine controller to increase engine speed to at least a first preselected level, and a second voltage trip point to which the programmed vocational controller is responsive for releasing the engine controller to return the engine to engine idle speed; and a plurality of programmed interlocks initiated in response to one or more motor vehicle conditions reported by the vocational controllers for preventing changes in engine speed under the direction of the battery monitoring program including an interlock for preventing changes in engine speed responsive to battery charge state when operation of the power take off application is engaged.

2. A motor vehicle as claimed in claim 1, wherein the specially programmed vocational controller is an electrical system controller and the vehicle battery voltage measurements are coupled directly to the electrical system controller with the second voltage trip point being a higher voltage than the first voltage trip point.

3. A motor vehicle as set forth in claim 1, further comprising:

a load shed trip point to which the programmed vocational controller is responsive for causing a vehicle subsystem to be turned off;

a power takeoff application installed on the motor vehicle; and one of the programmed interlocks being responsive to the state of the power takeoff application.

4. A motor vehicle as set forth in claim 1, further comprising:

one of the programmed interlocks being responsive to combinations of motor vehicle conditions.

5. A motor vehicle as set forth in claim 1, the battery monitor program further comprising:

means for comparing the measured battery voltage against a first voltage trip level and initiating a delay if the magnitude of the measured battery voltage is less than the first voltage trip level; and means responsive to occurrence of the delay for comparing an updated measured battery voltage against the first voltage trip level and triggering an increase in engine speed if the updated measured battery voltage remains at a lesser magnitude than the first voltage trip level.

6. A motor vehicle as set forth in claim 5, the battery monitor program further comprising:

means for executing a delay after a triggered increase in engine speed;

means responsive to execution of the delay after a triggered increase in engine speed for comparing yet another updated measurement of battery voltage against a idle return trigger level and, responsive to a measured battery voltage being of greater magnitude than the trigger level, for further causing the engine to return to an idle level.

7. A motor vehicle as set forth in claim 6, the battery monitor program further comprising:

means responsive to the measured battery voltage being of a smaller magnitude than the idle return trigger level for comparing the measured battery voltage against a load shedding trigger level and if the measured battery voltage is of greater magnitude than the load shedding trigger level, causing the program to loop through cycles of measurements of battery voltage and comparison of the battery voltage measurements with the idle return trigger level and the load shedding trigger level; and means responsive to a battery voltage measurement less than the load shedding trigger level for cutting power to a vehicle subsystem by issuance of a instruction on one of the vehicle controller area networks for operation on by a vocational controller connected to the vehicle controller area network.

8. A motor vehicle as set forth in claim 7, further comprising:

means responsive to cutting power to a vehicle subsystem for executing a program delay; and means responsive to execution of a program delay after a power cut to a vehicle subsystem for comparing a new measurement of vehicle battery voltage to a load restore trigger and responsive to the new measurement being larger in magnitude than the load restore trigger returning power to a vehicle subsystem previously cut, responsive to the new measurement being smaller in magnitude than the load shedding trigger cutting power to another vehicle subsystem, and responsive to the new measurement being of a magnitude between the load shedding trigger and the load restore trigger cycling delays, vehicle battery voltage remeasurements and comparisons of each new measurement of battery voltage to the trigger levels.

* * * * *